April 7, 1931.  W. HULSEBOS  1,799,167

WABBLER DRIVING MECHANISM

Filed April 4, 1925

Inventor

W. Hulsebos by

Atty.

Patented Apr. 7, 1931

1,799,167

UNITED STATES PATENT OFFICE

WICHERT HULSEBOS, OF LAREN, NEAR HILVERSUM, NETHERLANDS

WABBLER DRIVING MECHANISM

Application filed April 4, 1925, Serial No. 20,808, and in the Netherlands April 16, 1924.

This invention relates to wabbler driving mechanism, for instance, for engines having their cylinders arranged equidistantly from the shaft and in parallel relation with one another. In known mechanism of this character, such as disclosed by the specification of French Patent 554,040, the wabbler proper imparts its movement to the shaft through two eccentric bearings, which are inclined relative to the axis of said shaft, to which they are rigidly secured. The movement is here transmitted through ball bearings, but owing to the fact that such bearings, as a rule, are not adapted to stand axial stresses, they are liable to rapid deterioration. This inconvenience has been met (see inter alia, the specification of British Patent 135,011) by supporting the wabbler in the direction of the axis of its eccentric bearings, but independently thereof, by members disposed on the shaft under the same inclination as said eccentric bearings. This construction, however, has the disadvantage that the pressures between the wabbler and the said supporting members such as ball bearings, may, owing inter alia to the unavoidable clearance in the eccentric bearings, locally rise to such a magnitude as to cause a breakdown.

My present invention has for its object to also meet the last mentioned difficulty and with this object in view I provide for a limited spherical freedom of movement of the wabbler relative to the inclined supporting members, or of said members relative to the shaft. With this construction the wabbler, when there is a certain amount of clearance in the eccentric bearings, automatically adjusts itself in such a manner, that the contact faces between the wabbler and the said supporting members and, consequently, also the balls that may be interposed, will be loaded uniformly throughout.

Figure 1:
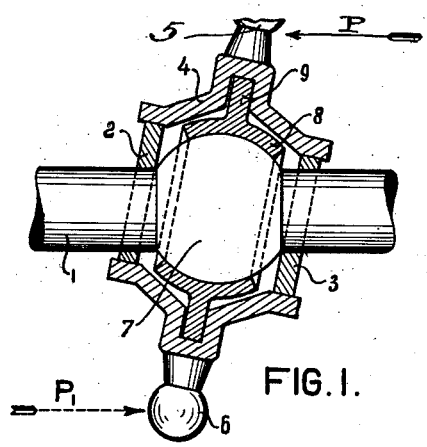

Further details of the invention will be described hereinafter with reference to the annexed drawing, in which Fig. 1 illustrates the principle of my invention and Figs. 2–6 show five different embodiments thereof in axial sectional views.

Referring to Fig. 1, mounted at a suitable inclination on the shaft 1 are two eccentrics 2 and 3 in engagement with the wabbler 4, the latter being actuated, through knobs 5 and 6, by the pistons of cylinders (not shown). Intermediate between the eccentrics 2 and 3, the shaft 1 has a spherically enlarged portion 7 closely fitting within a correspondingly shaped annulus 8 provided with a radial, centrally disposed flange 9. The said flange 9 projects into an annular recess or groove of the wabbler 4.

If a force P is applied to knob 5, the wabbler 4 is pressed against flange 9 as shown and moves over the eccentrics 2 and 3 which, as will be understood, are not subjected to the force P, but only serve to transmit to shaft 1 the moment of this force P relative to said shaft. If, as will practically always be the case, there is a certain amount of clearance between the eccentrics 2, 3 and the wabbler 4, the annulus 8 will move over the spherical enlargement 7 of the shaft, until said clearance has been compensated for. Consequently, the wabbler cannot apply a moment to flange 9, so that the pressure between these parts will be uniformly distributed over their contact faces.

If the ball joint is subjected to the action of a force $P_1$ equal to P but acting in the opposite direction, a true couple is applied to the wabbler 4. This couple is transmitted in full to the shaft 1, through the eccentrics 2 and 3, whereas the flange 9 remains inactive, i. e. does not transmit any force to the shaft.

Figure 2:
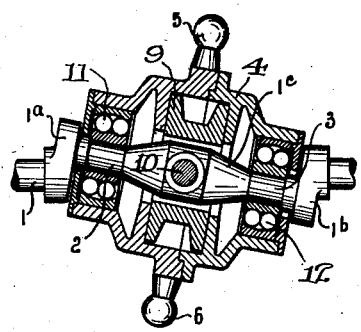

According to Fig. 2, the shaft 1 is not provided with two ordinary eccentrics, but with a Z-crank, the webs of which are designated by 1a, 1b and the pin by 1c. As will be understood, the cylindrical end portions of crank pin 1c are the mechanical equivalents of the eccentrics 2 and 3 shown in Fig. 1 and have, therefore, been designated by the same reference numerals. The flange 9, which fits in a recess of the wabbler 4, is connected to the shaft through a pin 10 passed through a hole in shaft 1, which hole flares from the centre toward either end, so that the pin 10 has freedom of limited oscillatory movement and the flange 9 can move through a spherical path as required. It should be well understood, however, that flange 9 only performs this movement when there is a certain amount of clearance in the ball bearings 11, 12 interposed between the wabbler 4 and the eccentrics 2, 3, or when the amount of said clearance increases. As long as this clearance remains constant, the flange 9 assumes an invariable position relative to shaft 1.

Figure 3:
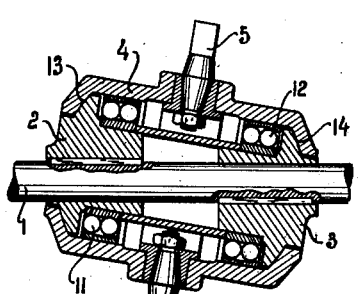

In Fig. 3, the end portions of the wabbler 4 engage the eccentrics 2 and 3, the contact faces being spherical. As a consequence, the wabbler can move through a limited distance spherically, but cannot move axially relative to the eccentrics, so that also in this embodiment the ball bearings 11, 12 are relieved of axial stresses irrespective of the amount of clearance therein.

Figure 4:
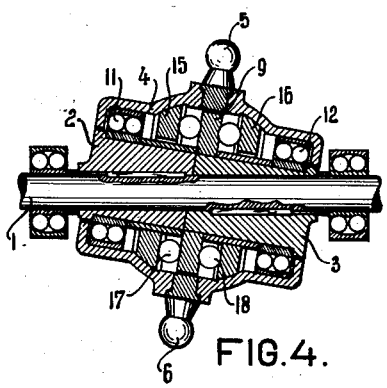

Fig. 4 shows a construction, in which the flange 9 is rigidly secured to the eccentric 3 and, thereby, to shaft 1. This flange forms the central race for two series or rows of balls 17 and 18, the outer races of which, designated by 15 and 16, engage the wabbler 4 by spherical faces so as to allow of a limited spherical movement of said wabbler, while the outer races themselves as well as the flange 9 assume an invariable position with respect to the shaft.

Figure 5:
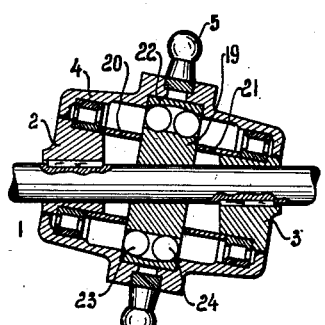

The embodiment shown in Fig. 5 is provided with a central, self-adjusting or aligning ball bearing, the inner race of which is held in its proper place by distance rings 20, 21 and has an invariable position with respect to the shaft 1. The outer ball race 22 is rigidly secured to the wabbler 4 and provided with a spherical tread for the balls 23, 24. This central ball bearing takes up axial stresses and at the same time allows of a limited spherical movement of the wabbler 4.

Figure 6:
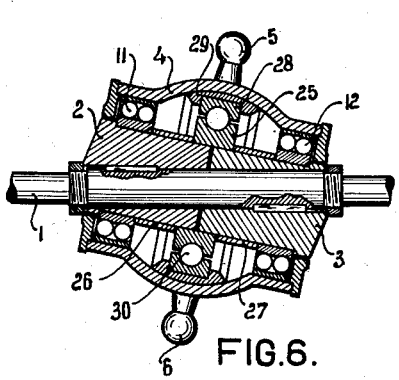

The construction shown in Fig. 6 corresponds to that illustrated in Fig. 5 so far as it also embodies a central ball bearing adapted to stand axial stresses owing to the grooves or treads in the ball races being exceptionally steep or deep. The inner ball race 25 is held in its proper place by distance rings 26, 27, and the outer race 28 is mounted in a ring 29 having a spherical face fitting against a spherical face of the wabbler 4, which, consequently, has freedom of limited spherical movement.

The engines, for which the described wabbler driving mechanism have been devised will, as a rule, be so constructed that the wabbler is coupled to pistons on either side so that in normal operation the wabbler is subjected to a true couple and not to axial stresses. Stated in other language, the special means for taking up axial stresses are only operative when the pressures exerted by the pistons are unequal, or when one of the pistons makes an idle stroke.

It goes without saying that the described wabbler mechanism can also be used when shaft 1 is a power shaft for driving pumps, compressors, etc., associated with the wabbler.

What I claim is:—

1. In combination with a rotatable shaft, a non-rotatable wabbler thereon, bearings for the wabbler which are eccentrically mounted on and inclined with respect to the shaft, and means mounted on the shaft for supporting the wabbler in the direction of the axes of said bearings, said means being provided with a universal joint allowing a spherical freedom of motion for the wabbler with regard to the shaft.

2. In combination with a rotatable shaft, a non-rotatable wabbler thereon, bearings for the wabbler which are eccentrically mounted on and inclined with respect to the shaft, means mounted on the shaft for supporting the wabbler in the direction of the axes of said bearings, there being spherical contacting surfaces between the wabbler and said means.

3. In combination with a rotatable shaft, a non-rotatable wabbler thereon, bearings for the wabbler eccentrically mounted on the shaft, a member mounted in an inclined position on the shaft and supporting the wabbler in the direction of the axes of the bearings, the member and wabbler having cooperating spherical faces to provide a bearing contact.

In testimony whereof I affix my signature.

WICHERT HULSEBOS.